US010084925B2

(12) United States Patent
Lim et al.

(10) Patent No.: US 10,084,925 B2
(45) Date of Patent: Sep. 25, 2018

(54) METHOD AND APPARATUS FOR PROCESSING CHARGING IN WIRELESS COMMUNICATION SYSTEM AND METHOD AND APPARATUS FOR PROVIDING POLICY SERVICE USING THE SAME

(71) Applicant: Samsung Electronics Co., Ltd., Suwon-si, Gyeonggi-do (KR)

(72) Inventors: Han-Na Lim, Seoul (KR); Ha-Kyung Jung, Seoul (KR); Jung-Shin Park, Seoul (KR); Ki-Suk Kweon, Suwon-si (KR); Beom-Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/678,293

(22) Filed: Apr. 3, 2015

(65) Prior Publication Data

US 2015/0288828 A1    Oct. 8, 2015

(30) Foreign Application Priority Data

Apr. 3, 2014   (KR) ...................... 10-2014-0039871

(51) Int. Cl.
*H04M 15/00* (2006.01)
*H04W 4/24* (2018.01)
(Continued)

(52) U.S. Cl.
CPC ........ *H04M 15/55* (2013.01); *H04L 12/1407* (2013.01); *H04L 41/0893* (2013.01);
(Continued)

(58) Field of Classification Search
CPC ...... H04M 15/55; H04W 36/24; H04W 88/06
See application file for complete search history.

(56) References Cited

U.S. PATENT DOCUMENTS 6,600,917 B1 * 7/2003 Maupin ................. H04W 48/16
455/414.1
2006/0198347 A1 * 9/2006 Hurtta .................. H04W 28/16
370/338
(Continued)

FOREIGN PATENT DOCUMENTS

EP          002723144    *  4/2014
KR   10-2006-0040227 A      5/2006
(Continued)

*Primary Examiner* — Myron K Wyche
(74) *Attorney, Agent, or Firm* — Jefferson IP Law, LLP

(57) ABSTRACT

Methods and apparatuses for processing charging in wireless communication systems and methods and apparatuses for providing providers' policy services through the charging process are provided. The method includes identifying, by an evolved Node B (eNB), a radio access technology (RAT) used by a user equipment (UE), and generating, by the eNB, charging information per use of a communication service by the UE according to the identified radio access technology (RAT). The method includes identifying, by an eNB, a RAT used by a UE, generating, by the eNB, charging-related information including RAT information indicating the identified RAT for a charging process per use of a communication service by the UE, and transmitting, by the eNB, the charging-related information to a network entity involved with the charging process.

38 Claims, 13 Drawing Sheets

(51) Int. Cl.
*H04L 12/24* (2006.01)
*H04L 12/14* (2006.01)
*H04W 88/10* (2009.01)
*H04W 8/22* (2009.01)

(52) U.S. Cl.
CPC ........ *H04L 41/5019* (2013.01); *H04M 15/41* (2013.01); *H04M 15/66* (2013.01); *H04W 4/24* (2013.01); *H04W 8/22* (2013.01); *H04W 88/10* (2013.01)

(56) References Cited

U.S. PATENT DOCUMENTS

| | | |
|---|---|---|
| 2008/0270274 A1 | 10/2008 | Mo et al. |
| 2009/0264097 A1* | 10/2009 | Cai .................... G06Q 30/04 455/406 |
| 2010/0074220 A1* | 3/2010 | Jung ................ H04W 36/0055 370/331 |
| 2012/0051352 A1 | 3/2012 | Morita et al. |
| 2012/0172031 A1* | 7/2012 | Marocchi ................ H04W 4/06 455/422.1 |
| 2013/0065596 A1* | 3/2013 | Frederiksen .......... H04W 36/24 455/436 |
| 2013/0102277 A1 | 4/2013 | Stenfelt et al. |
| 2014/0038552 A1* | 2/2014 | Rinne ................. H04L 41/5029 455/406 |
| 2014/0213256 A1* | 7/2014 | Meylan ................ H04W 36/22 455/436 |
| 2014/0213258 A1* | 7/2014 | Dahlen ............ H04W 36/0083 455/436 |
| 2014/0233432 A1 | 8/2014 | Lim et al. |
| 2015/0049610 A1* | 2/2015 | Kim ...................... H04W 4/005 370/233 |

FOREIGN PATENT DOCUMENTS

| | | |
|---|---|---|
| KR | 10-2008-0089635 A | 10/2008 |
| WO | 2013/048187 A2 | 4/2013 |

* cited by examiner

METHOD AND APPARATUS FOR PROCESSING CHARGING IN WIRELESS COMMUNICATION SYSTEM AND METHOD AND APPARATUS FOR PROVIDING POLICY SERVICE USING THE SAME

CROSS-REFERENCE TO RELATED APPLICATION(S)

This application claims the benefit under 35 U.S.C. § 119(a) of a Korean patent application filed on Apr. 3, 2014 in the Korean Intellectual Property Office and assigned Serial number 10-2014-0039871, the entire disclosure of which is hereby incorporated by reference.

TECHNICAL FIELD

The present disclosure relates to methods and apparatuses for processing charging in a wireless communication system.

BACKGROUND

Wireless communication systems, developed to provide communication services while allowing user mobility, are surging in use. The rapid development of technology has brought the system performance up to the level at which various multimedia services can be served wirelessly. As an example of wireless communication services, Long Term Evolution (LTE) proposed by the 3rd Generation Partnership Project (3GPP), is now in service in a number of countries. LTE is a technology for implementing high-speed packet-based communication to provide a transmission speed up to 100 Mbps. LTE, adding various state-of-art technologies, has evolved to a further advanced form offering higher data rates, so-called LTE-Advanced (LTE-A). LTE-A is now in commercial service. Hereinafter, LTE system and LTE-A system are collectively referred to as an LTE system.

Wireless communication systems are recently being developed to support a number of different radio access technologies (RATs). There are various types of RATs, such as, e.g., wireless fidelity (Wi-Fi) offering IEEE802.11x-based wireless local area network (LAN) services, Universal Terrestrial Radio Access Network (UTRAN) providing legacy 3G-based services, and LTE-based Evolved UTRAN (E-UTRAN). User equipments (UEs) such as smartphones, whose use is skyrocketing, basically support multiple RATs. Accordingly, it is critical for the wireless communication system provider to identify what RAT the UE is using so as to process charging and offer policy services in differentiated manners depending on RATs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides an efficient charging processing method and apparatus in a wireless communication system supporting a plurality of radio access technologies (RATs).

Another aspect of the present disclosure is to provide a method and apparatus for efficiently providing a business provider's policy service in association with a charging process in a wireless communication system supporting a plurality of RATs.

In accordance with an aspect of the present disclosure, a method for processing charging in a wireless communication system supporting a plurality of RATs comprises identifying, by an evolved Node B (eNB), a radio access technology (RAT) used by a user equipment (UE), and generating, by the eNB, charging information per use of a communication service by the UE according to the identified RAT.

In accordance with another aspect of the present disclosure, an eNB in a wireless communication system supporting a plurality of RATs comprises a communication interface and a controller configured to identifying a RAT used by a UE and to generate charging information per use of a communication service by the UE according to the identified RAT.

In accordance with another aspect of the present disclosure, a method for processing charging in a wireless communication system supporting a plurality of RATs comprises identifying, by an eNB, a RAT used by a UE, generating, by the eNB, charging-related information including RAT information indicating the identified RAT for a charging process per use of a communication service by the UE, and transmitting, by the eNB, the charging-related information to a network entity involved with the charging process.

In accordance with another aspect of the present disclosure, an eNB in a wireless communication system supporting a plurality of RATs comprises a communication interface and a controller configured to identify a RAT used by a UE, to generate charging-related information including RAT information indicating the identified RAT for a charging process per use of a communication service by the UE, and to transmit the charging-related information to a network entity involved with the charging process.

In accordance with another aspect of the present disclosure, a method for processing charging in a wireless communication system supporting a plurality of RATs comprises receiving, by a first network entity processing signaling of subscription information or policy information of a UE, charging-related information from an eNB including RAT information indicating a RAT used by the UE, configuring, by the first network entity, a bearer context for the UE based on the RAT information, and transmitting, by the first network entity, the RAT information to a second network entity involved with the charging process.

According to an embodiment of the present disclosure, a network entity for processing charging in a wireless communication system supporting a plurality of RATs comprises a communication interface and a controller configured to receive, from an eNB, charging-related information including RAT information indicating a RAT used by a UE, to configure a bearer context for the UE based on the RAT information, and to transmit the RAT information to another network entity involved with the charging process.

In accordance with another aspect of the present disclosure, a method for processing a Quality of Service (QoS) policy to be applied to a UE in a wireless communication system supporting a plurality of RATs comprises receiving, by an eNB, QoS policy information according to a RAT used by the UE from a network entity processing signaling of subscription information or policy information of the UE, and applying, by the eNB, a QoS policy including at least one of bearer allocation for the UE or transmission rate setting based on the received QoS policy information.

In accordance with another aspect of the present disclosure, an eNB in a wireless communication system supporting a plurality of RATs comprises a communication interface and a controller configured to receive QoS policy information according to a RAT used by a UE from a network entity processing signaling of subscription information or policy information of the UE, and to apply a QoS policy including at least one of bearer allocation for the UE or transmission rate setting based on the received QoS policy information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
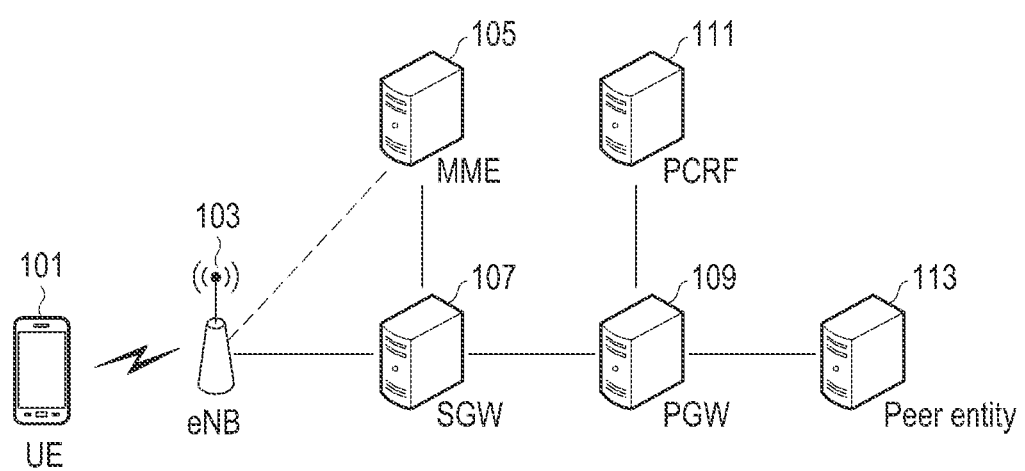
FIG. 1 is a view illustrating the configuration of a typical Long Term Evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When determined to make the subject matter of the present disclosure unclear, the detailed of the known functions or configurations may be skipped. The description of various embodiments of the present disclosure primarily targets evolved packet system (EPS), but the subject matter of the present disclosure may also be applicable to other communication systems with a similar technical background with minor changes without significantly departing from the scope of the present disclosure, and this may be possible under the determination of those skilled in the art to which the present disclosure pertains. Further, according to various embodiments of the present disclosure, LTE-Unlicensed (LTE-U) is described as an example of the plurality of radio access technologies (RATs), but various embodiments of the present disclosure are also applicable to other RATs such as wireless fidelity (Wi-Fi).

According to an embodiment of the present disclosure, as an example, LTE-U is hereinafter described which is recently under research for LTE systems in connection with a scheme in which a single base station evolved Node B (eNB) supports a plurality of RATs. LTE-U is an item under discussion by the 3rd Generation Partnership Project (3GPP) radio access network (RAN) standardization group is a technology for applying an long term evolution (LTE) communication scheme to an unlicensed band of a 5 GHz band (e.g., 5.8 GHz or 5.9 GHz). In case one base station eNB supports a plurality of RATs, the provider of the wireless communication system may process charging information in different ways for the RATs, respectively, and may apply different polices.

In case the wireless communication provider serves a communication service through LTE-U, the provider may operate the system so that the provider uses LTE-U in order to reduce the load of the LTE system. By the nature of the unlicensed band used by LTE-U, the quality of service (QoS) of the communication service may be deteriorated, but the provider may operate a policy service for providing a communication service to LTE-U users at relatively low communication fees. Further, upon use of LTE-U, some services such as the high-definition voice service (HD voice/VoLTE) might be not permitted. Further, upon use of LTE-U, the permitted highest transmission rate (bit rate) may be unlimited.

First, for a better understanding of the present disclosure, the configuration of a typical LTE system and the bearer structure of the LTE system are described.

FIG. 1 is a view illustrating the configuration of a typical LTE system according to an embodiment of the present disclosure.

Referring to FIG. 1, an EPS includes a user equipment (UE) 101, an evolved-UTRAN (E-UTRAN) including an eNB 103 configuring a radio network, and evolved packet core (EPC) configuring a core network including a mobility management entity (MME) 105, a serving gateway (SGW) 107, a PDN gateway (PGW) 109, and a policy and charging rules function (PCRF) 111. The UE 101 may perform communication with a peer entity 113, an opposing party of the communication, through the E-UTRAN and the EPC. The MME 105 is in charge of the control plane in the EPC, and the SGW 107 and the PGW 109 are in charge of the user plane in the EPC. The MME 105 manages the mobility of the UE 101 and processes signaling of subscription information or policy information of the UE 101. Further, the MME 105 involves the QoS of the UE 101 based on the subscription information of the UE 101. The PCRF 111 is in charge of a provider's policy to be applied to the UE 101, and the SGW 107 and the PGW 109 generate charging information of the UE 101. The PGW 109 receives the provider's policy information from the PCRF 111 and serves to perform the corresponding policy.

Figure 2:
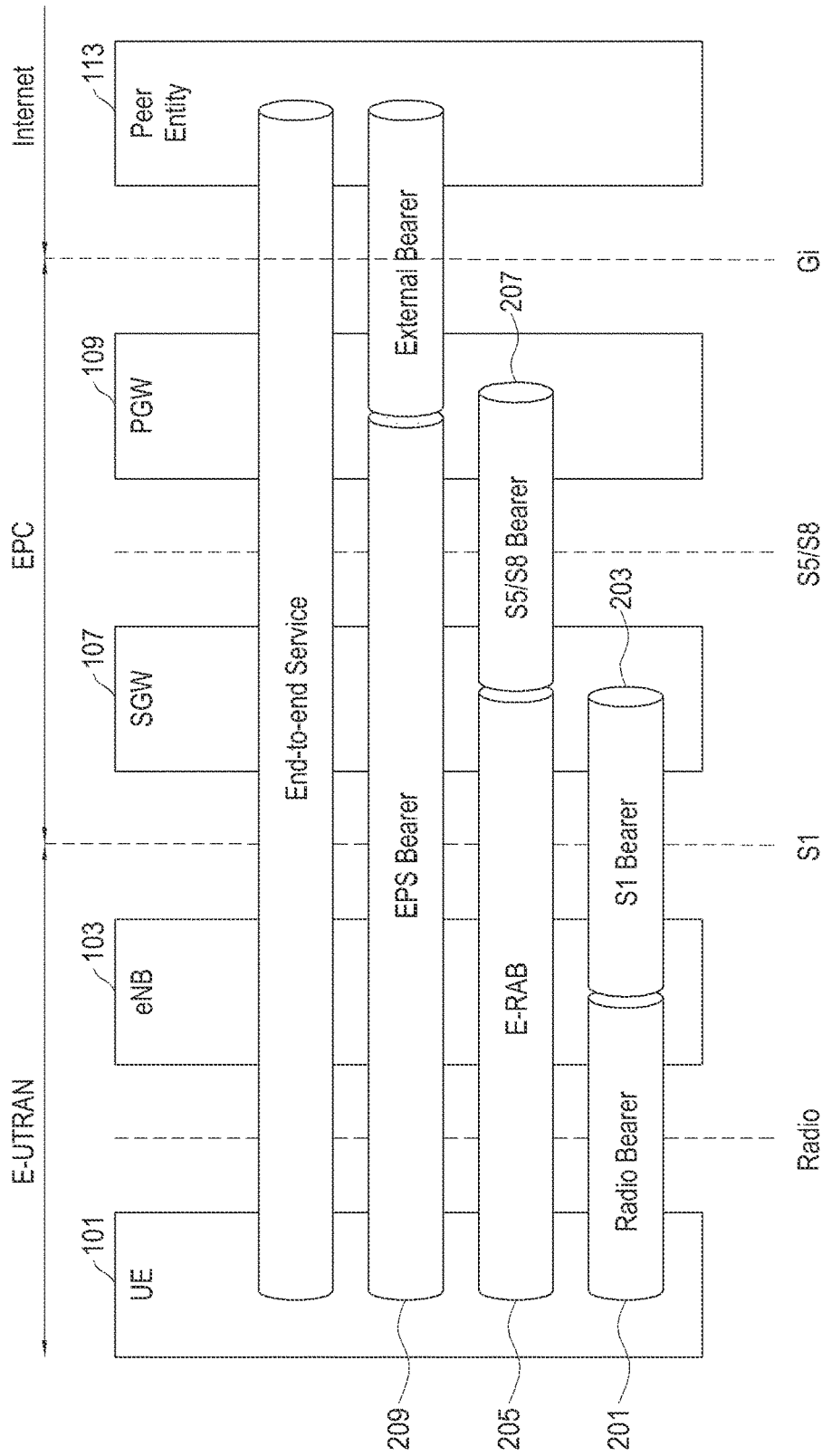
FIG. 2 is a view illustrating a bearer structure in a typical LTE system according to an embodiment of the present disclosure.

FIG. 2 is a view illustrating a bearer structure in a typical LTE system according to an embodiment of the present disclosure.

Referring to FIG. 2 defines various bearer services to guarantee a predetermined level of QoS for an end-to-end service between users (e.g., between the UE 101 and its opposing party of the communication, i.e., the peer entity 113). The end-to-end service is divided into multiple sections, such as the E-UTRAN, EPC, and Internet, through various network entities in the LTE system. A data transmission service in the EPS is provided through an EPS bearer 209, and the EPS bearer 209 is the basic unit of application of the QoS in the LTE system. Specifically for the bearer structure of FIG. 2, the EPS bearer 209 is divided into an evolved radio access bearer (E-RAB) 205 and an S5/S8 bearer 207, and the E-RAB 205 is divided into a radio bearer (RB) 201 and an S1 bearer 203. The identification between the UE 101 and the eNB 103 is performed by the RB 201, and the identification between the eNB 103 and the SGW 107 is performed by the S1 bearer 203. The identification between the SGW 107 and the PGW 109 is performed by the S5 bearer 207.

An LTE-U technology may be implemented by adding, e.g., a channel card to the eNB in the LTE system, and a transmission service is provided using the radio bearer. Hereinafter, the radio bear used in existing LTE systems is denoted an LTE bearer, and the RB used in LTE-U technologies is denoted an LTE-U bearer. In the LTE-U technologies, the eNB may be aware that the UE uses an LTE-U frequency in an unlicensed band. However, other network entities in the ECP than the eNB in the LTE-U system cannot be aware whether the UE uses an LTE-U technology as RAT. This is why even the EPC in the LTE system providing an LTE-U service (hereinafter, "LTE-U system") uses the S1 bearer and the S5 bearer like in existing LTE systems.

Accordingly, the PGW generating charging information in the EPC of the LTE-U system cannot be aware whether the UE uses the RAT of existing LTE systems or the RAT of the LTE-U technology and thus cannot generate charging information per RAT. Further, the PGW in the LTE-U system cannot be aware of RAT information used by the UE and thus cannot apply the provider's policy per RAT. Accordingly, there is a need for a scheme by which even the network entity (e.g., PGW) processing charging information in the EPC of the LTE-U system can identify the RAT information used by the UE.

Now proposed is a specific procedure in which the eNB directly identifies the RAT used by the UE to thus generate charging information for processing charging information in the LTE system using the LTE-U technology or the eNB transfers RAT information to the PGW of the EPC, according to an embodiment of the present disclosure.

First, some terms as used herein are defined. "Charging information" includes information (e.g., user amount or use time) on use of a communication network by a user, which is monitored, collected, and managed by the provider's network. Here, the communication use information includes a charging data record (CDR), and the communication fee charged to the user is computed using the communication network use information. "Billing information" means information on a fee charged to the user and is generated using the CDR. The CDR means information collected for a charging event (e.g., a call setup time, call duration, or amount of transmitted amount) and is used for computation of a fee to be charged to the user. One or more CDRs may be generated for one charging event due to, e.g., long-term use of communication or one or more targets for charging. "Partial CDR" provides partial information of a subscriber session, and one long session may be covered by a few partial CDRs.

Figure 3A:
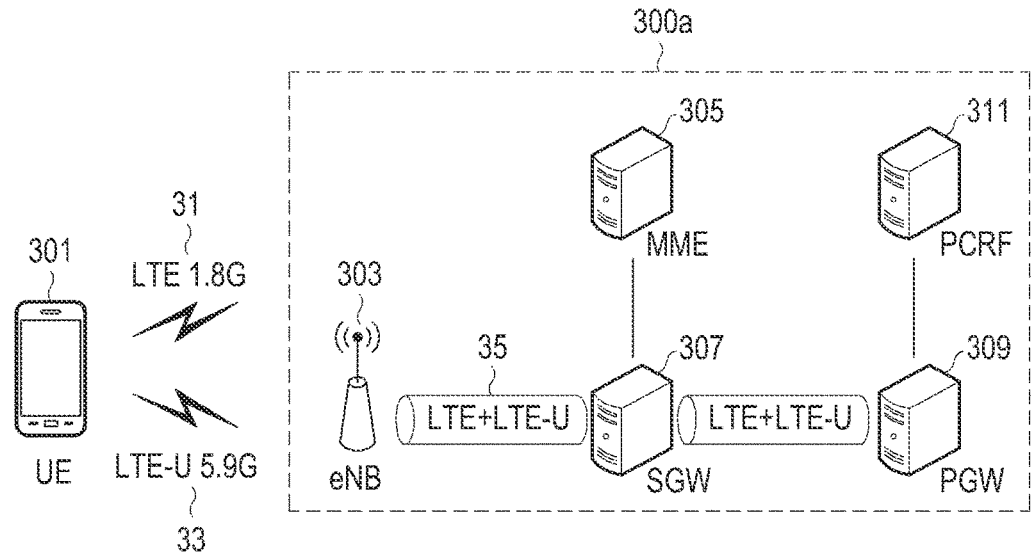
FIG. 3A is a view illustrating a configuration of an LTE-Unlicensed (LTE-U) system supporting a plurality of radio access technologies (RATs) according to an embodiment of the present disclosure.

FIG. 3A is a view illustrating a configuration of an LTE-U system supporting a plurality of RATs according to an embodiment of the present disclosure.

The network entities 300a constituting the LTE-U system of FIG. 3A include a UE 301, an eNB 303, an MME 305, a SGW 307, a PGW 309, and a PCRF 311, and basic functions of the network entities are the same as those of the network entities in the LTE system of FIG. 1 except for charging information processing scheme and providing a policy service using the same, which are described below, and thus, detailed description thereof is omitted.

The embodiment shown in FIG. 3A proposes a scheme for using a single S1 bearer 35 for the LTE bearer and the LTE-U bearer. The eNB 303 may distinguish whether the UE 301 uses the RAT of existing LTE systems (hereinafter, a first RAT) or the RAT of the LTE-U technology (hereinafter, a second RAT) by identifying what frequency band (31 or 33) is used by the UE 301. The EPC including the MME 305, the SGW 307, the PGW 309, and the PCRF 311 cannot directly distinguish the RATs used by the UE 301. The embodiment illustrated in FIG. 3A is described with two schemes: scheme 1 in which the eNB 303 directly generates charging information, and scheme 2 in which the eNB 303 transfers charging information-related information used for generating charging information to the PGW 309, and the PGW 309 generates charging information based on the charging information-related information received from the eNB 303.

Scheme 1

In an embodiment of scheme 1, the eNB 303 may identify the frequency band where the RB of the UE 301 is configured and may add identification information (marking) for distinguishing the RATs used by the UE 301 to data communicated by the UE 301 in order to distinguish whether the UE 301 uses the first RAT using a first frequency band 31 or the second RAT using a second frequency band 33. Further, the eNB 303 may count an amount of data communicated for each of the RATs used by the UE 301.

Figure 11:
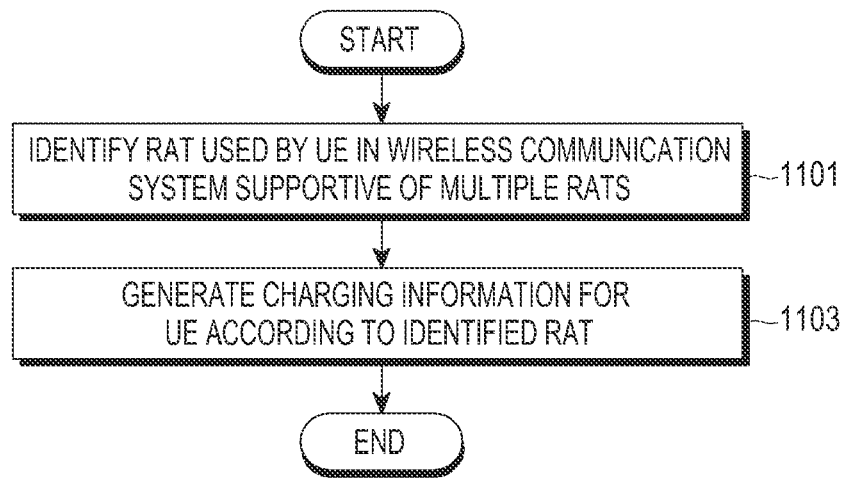
FIG. 11 is a view illustrating a method in which an eNB processes charging in a wireless communication system supporting a plurality of RATs according to an embodiment of the present disclosure.

FIG. 11 is a view illustrating a method in which an eNB processes charging in a wireless communication system supporting a plurality of RATs according to an embodiment of the present disclosure. FIG. 11 illustrates an operation of the eNB 303 performing the embodiment of scheme 1.

Referring to FIG. 11, the eNB 303 identifies the RAT used by the UE 301 at operation 1101, and at operation 1103, generates charging information per use of the communication service by the UE 301 according to the identified RAT at operation 1103.

In order to generate the charging information for the UE 301, for the data differentiated per RAT as described above, the eNB 303 is implemented with a charging trigger function (CTF) and a charging data function (CDF). The CTF is integrated in the eNB 303 and generates a charging event, such as a call setup time, call duration, or amount of data transmitted, or checks the occurrence of a charging event and transfers whether the charging event occurs to the CDF. The CDF generates charging information including the CDR. Although in various embodiments of the present disclosure CDR is exemplified as an example of the charging information generated by the eNB 303, the charging information is not limited to CDR, and use of other information related to the user's communication network use information is possible as well.

In the embodiment of scheme 1 above, the CTF of the eNB 303 triggers the CDF at the time that the LTE-U bearer is established. For example, the eNB 303 sets the time when a RB establishment complete message, a message indicating that the LTE-U bearer has been successfully established, was transmitted to the UE 301, to the triggering time for generating the charging information. Or, the eNB 303 may trigger the CDF after receiving, from the UE 301, a message responsive to the RB establishment complete message. The CDR generated by the eNB 303 may be denoted, e.g., an eNB-CDR. In this case, the eNB 303 performs a charging gateway function (CFG). Or, the CDR generated by the eNB 303 may be delivered to the PGW 309. In this case, the PGW 309 performs a CFG like in legacy LTE. The CDR generated by the eNB 303 is delivered to a server/device collecting charging information in the LTE system operated by the provider through the PGW 309, periodically, at a particular time, or when a particular event occurs. The CDR generated by the eNB 303 is delivered to a server/device collecting charging information in the LTE system operated by the provider, periodically, at a particular time, or when a particular event occurs. The period, time, or event where the charging information is delivered may be set up by the provider. In case online charging is performed in real-time, the eNB 303 receives information for online charging from a charging server (not shown), e.g., an online charging server. For example, the eNB 303 receives credits indicating the communication time and the amount of data available to the user from the charging server upon the user's Attach process. Thereafter, the eNB 303 deducts the credits whenever a charging event, such as use of data, occurs. An existing credit deducting scheme may be adopted for the process. Further, when using up the credits, the eNB 303 may inform the charging server of the charging event to restrict the user's communication. As in the embodiment of scheme 1, in case the charging domain of the LTE system includes the eNB 303, the eNB 303 may have a connection with the CDF through an RF interface using a diameter protocol. The diameter protocol is a protocol standardized by the IETF aiming evolved authentication and may be primarily used in an entity responsible for such functions as subscription and charging. Further, in such case, the eNB 303 may include the CDF.

Now described is scheme 2 in which the PGW 309 generates charging information based on charging-related information received from the eNB 303.

Scheme 2

In the embodiment of scheme 2, the eNB 303 collects charging-related information used for generating charging information upon communication of data. As the charging-related information, at least one of RAT information indicating the RAT type used by the UE 301, time/duration of communication by the UE 301, and amount of data transmitted (data volume) may be collected. Other various additional information available for generating charging information than those exemplified above may also be used as the charging-related information, and such charging-related information may be set up by the communication provider.

Figure 12:
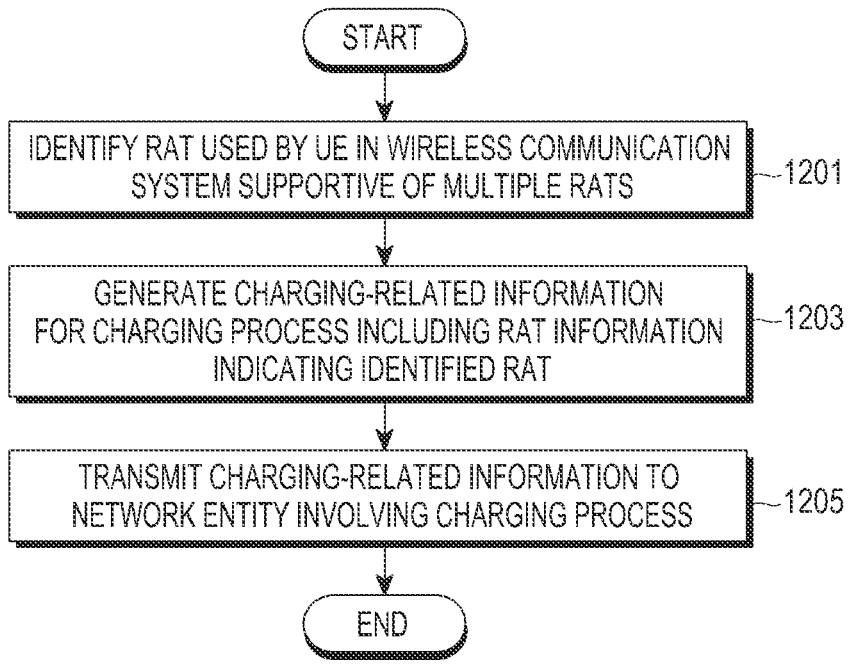
FIG. 12 is a view illustrating a method in which an eNB processes charging in a wireless communication system supporting a plurality of RATs according to another embodiment of the present disclosure.

FIG. 12 is a view illustrating a method in which an eNB processes charging in a wireless communication system supporting a plurality of RATs according to another embodiment of the present disclosure. FIG. 12 illustrates an operation of the eNB 303 performing the embodiment of scheme 2.

Referring to FIG. 12, the eNB 303 identifies the RAT used by the UE 301 at operation 1201, and at operation 1203, generates charging-related information including the RAT information indicating the identified RAT in order to process charging according to the use of communication service by the UE 301. At operation 1205, the eNB 303 transmits the charging-related information to a network entity involving the charging process. The network entity involving the charging process may be, e.g., the MME 305, the PGW 309, or the SGW 307.

The following Table 1 shows examples of the charging-related information.

TABLE 1

| charging-related information | details |
|---|---|
| record type | IP CAN (Connectivity Access Network) bearer record |
| charging ID | IP CAN bearer Charging identifier used to identify this IP CAN bearer |

TABLE 1-continued

| charging-related information | details |
| --- | --- |
| serving node address | List of SGSN/S-GW/ . . . etc control plane IP addresses |
| serving node type | List of serving node types in control plane (SGSN, SGW, etc). The serving node types listed here map to the serving node addresses listed in the field "Serving node Address" in sequence. |
| record opening time | Time stamp when IP CAN bearer is activated in this eNB or record opening time on subsequent partial records. |
| duration | Duration of this record in the eNB |
| cause for record closing | The reason for the release of record from this eNB. |
| charging characteristics | The Charging Characteristics applied to the IP CAN bearer |
| node ID | Name of the recording entity |
| local record sequence number | Consecutive record number created by this node |
| APN selection mode | An index indicating how the APN(Access Point Name) was selected |
| Served MSISDN | The primary MSISDN (Mobile Station International Subscriber Directory Number) of the subscriber. |

In the embodiment of scheme 2, among the information exemplified in Table 1, the internet protocol (IP) connectivity access network (CAN) bearer is an EPS bearer, and the serving node address and serving node type are information related to the SGW 307. The eNB 303 uses the SGW 307 obtained during the process of establishing the EPS bearer as the serving node information (i.e., the serving node address and serving node type). The APN selection mode in Table 1 may be obtained from the PGW 309 during the process of configuring the EPS bearer or from the subscription information. The eNB 303 may transfer the charging-related information collected as above to the PGW 309 without a separate process or may treat/process the same in a similar form to the charging information and transfer the treated/processed information.

In the embodiment of scheme 2, the charging information or charging-related information generated by the eNB 303 may be delivered to the PGW 309 using the GPRS tunneling protocol (GTP)-C or GTP-U format defined in the 3GPP standard.

Specifically, the eNB 303 may transfer the charging-related information to the PGW 309 through the GTP-C format, which is a control plane message, or the GTP-U format, which is a user plane message. In case the GTP-C is used, the eNB 303 may include the charging-related information in an existing signaling message transferred to the PGW 309 and transmit the same to the PGW 309. In another embodiment, the charging-related information may be included in a session management response message transferred from the eNB to the MME during an EPS dedicated bearer activation process for generating a dedicated bearer in the LTE system and may be transferred. In such case, the MME 305 may include the charging-related information in a create bearer response transferred to the SGW 307/PGW 309 and may transmit the same. In still another embodiment, the eNB 303 may use a GTP-C message of a new format as proposed according to an embodiment of the present disclosure, in order to deliver the charging-related information to the PGW 309. The following Table 2 shows an example of the new GTP-C message as proposed in this embodiment. The new GTP-C message may be delivered to the PGW 309 when the charging-related information is generated, periodically, when a particular event occurs, or when a predetermined amount of charging-related information is collected.

TABLE 2

CHARGING DATA INFORMATION TRANSFER (user identity, charging related information, . . . )
CHARGING DATA INFORMATION TRANSFER ACK In Table 2 above, "CHARGING DATA INFORMATION TRANSFER" refers to the new GTP-C message for delivering the charging-related information, and "CHARGING DATA INFORMATION TRANSFER ACK" refers to a response message transmitted to the eNB 303 from the PGW 309 having received the charging-related information.

In case the charging-related information is transmitted through GTP-U, the eNB 303 generates a GTP-U message including the charging-related information as data and transfers the GTP-U message to the PGW 309. The eNB 303 may generate and transmit the GTP-U message, e.g., when the charging-related information is generated, periodically, when a particular event is generated, or when a predetermined amount of charging-related information is collected. Although in the embodiment of scheme 2 the PGW 309 receives the charging-related information and generates charging information, according to another embodiment, the SGW 307 may receive the charging-related information from the eNB 303 and generate charging information.

Figure 4:
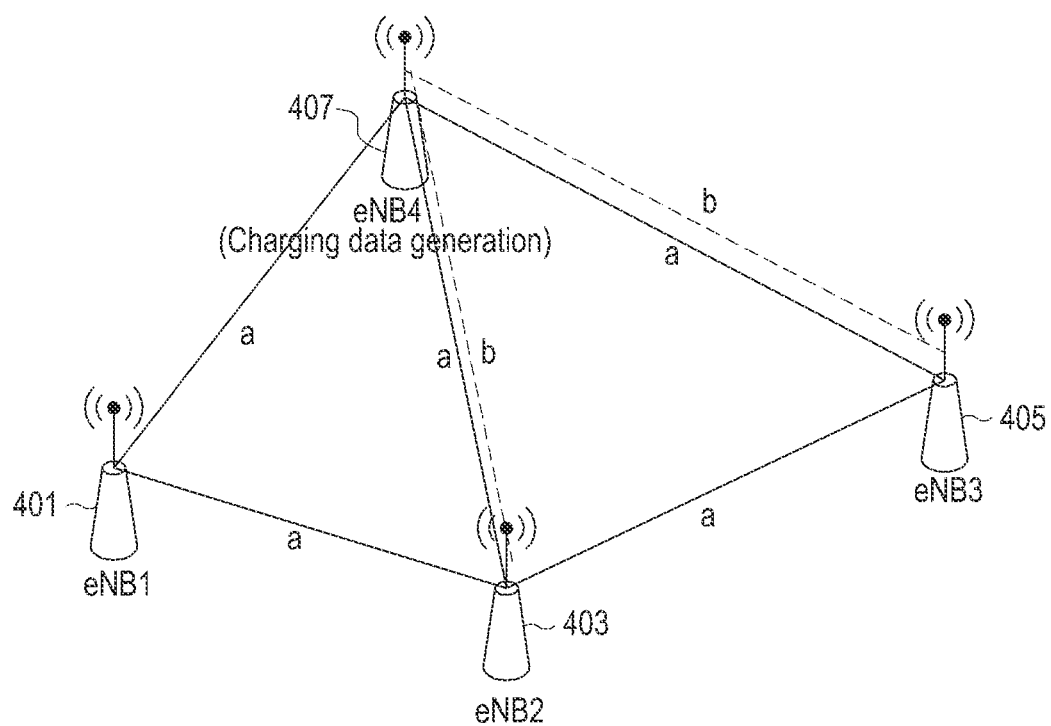
FIG. 4 is a view illustrating an example in which multiple evolved Nodes B (eNBs) cooperatively collect charging-related information and generate charging information according to an embodiment of the present disclosure.

Further, according to still another embodiment, the eNB with the function of generating charging information in scheme 1 above may play a role as the PGW generating charging information in scheme 2. According to yet still another embodiment, an eNB may collect charging-related information and transfer the collected charging-related information to another eNB generating charging information as in scheme 1, so that the other eNB may generate charging information. FIG. 4 is a view illustrating an example in which multiple eNBs cooperatively collect charging-related information and generate charging information according to an embodiment of the present disclosure.

Referring to FIG. 4, eNBs denoted with reference numerals 401, 403, and 405 may collect charging-related information as in scheme 2, and an eNB denoted with reference numeral 407 may receive the charging-related information from the eNBs 401, 403, and 405 and generate charging information. The eNBs 401, 403, 405, and 407 of FIG. 4 are connected with one another via X2 interfaces (denoted with reference character "a" in FIG. 4), which are inter-eNB interfaces in the 3GPP standard.

The eNBs 401, 403, and 405 having collected the charging-related information may transfer their respective charging-related information to the eNB 407 through the X2 interfaces, or the eNBs 403 and 405 may transfer the charging-related information to the eNB 407 through the provider's separate internal interfaces (denoted with reference character "b" in FIG. 4) for delivery of charging-related information.

As the message carrying the charging-related information in the embodiment of FIG. 4, the legacy X2 message defined in the 3GPP standard may be adopted, or a new type of X2 message may be adopted. Upon use of the legacy X2 message, the charging-related information is included, e.g., as a parameter of the message, and upon use of a new-type X2 message, a message as shown in Table 2 above may be used. Upon use of the provider's internal interfaces, the charging-related information may be delivered through a message or protocol internally determined by the provider.

Although in the embodiment of FIG. 4 all of the eNBs 401, 403, 405, and 407 are connected with one another, all or only some of the eNBs may be connected with one another depending on network implementations. Further, all of the eNBs may be connected with the eNB generating charging information, or some of the eNBs may be connected with the eNB generating charging information.

Figure 3B:
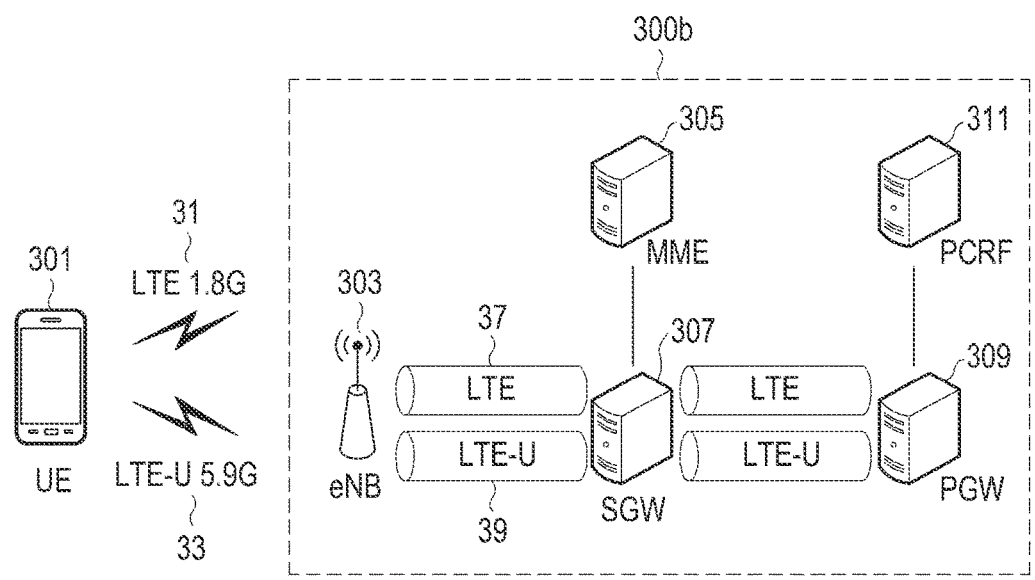
FIG. 3B is a view illustrating a configuration of an LTE-U system supporting a plurality of RATs according to an embodiment of the present disclosure.

FIG. 3B is a view illustrating a configuration of an LTE-U system supporting a plurality of RATs according to an embodiment of the present disclosure. Like in the embodiment of FIG. 3B, the network entities 300b constituting the LTE-U system of FIG. 3B include a UE 301, an eNB 303, an MME 305, a SGW 307, a PGW 309, and a PCRF 311, and basic functions of the network entities are the same as those of the network entities in the LTE system of FIG. 1 except for charging information processing scheme and providing a policy service using the same, which are described below, and thus, detailed description thereof is omitted. The differences between the embodiment of FIG. 3B and the embodiment of FIG. 3A lie in that the embodiment of FIG. 3B use separate S1 bearers: the LTE bearer and the LTE-U bearer. As such, if the eNB 303 distinguishes the first RAT and the second RAT used by the UE 301 and configures their respective S1 bearers 37 and 39, the network entities in the EPC may distinguish which one of the first RAT and the second RAT the UE 301 uses. In the embodiment of FIG. 3B, the eNB 303 provides the RAT information indicating the type of the RAT used by the UE 301 to the network entity in the EPC (e.g., the MME 305, the SGW 307, or the PGW 309), and the network entity receiving the RAT information from the eNB 303 generates charging information for the UE 301.

Meanwhile, in the embodiment of FIG. 3B, in case the UE 301 uses the LTE-U-based second RAT alone (for example, assume that the user sets the UE 301 through the settings menu such that the LTE-based first RAT is not used), the eNB 303 may transmit the RAT information to the PGW 309 using a legacy message as defined in the 3GPP standard or a brand new message as proposed in the instant embodiment. Upon transmission of the RAT information using the legacy message, the eNB 303 may include a parameter indicating the RAT type (e.g., RAT Type) (i.e., the RAT information) in an S1-AP message, which is delivered from the eNB 303 to the MME 305, e.g., in the Attach procedure/Tracking Area Update procedure/Service Request procedure defined in the 3GPP standard and may transmit the same, so as to inform that the radio bearer used by the UE 301 is the LTE-U bearer. The MME 305 configures the bearer context of the UE 301 based on the RAT information received from the eNB 303 and provides the RAT information to the SGW 307/PGW 309 as well. In an embodiment of the present disclosure, "bearer" is a pathway for transmitting a service to the UE 301 and may be referred to as with different terms depending on access networks. For example, such may include "floor" or "EPS bearer" in the LTE system.

Figure 13:
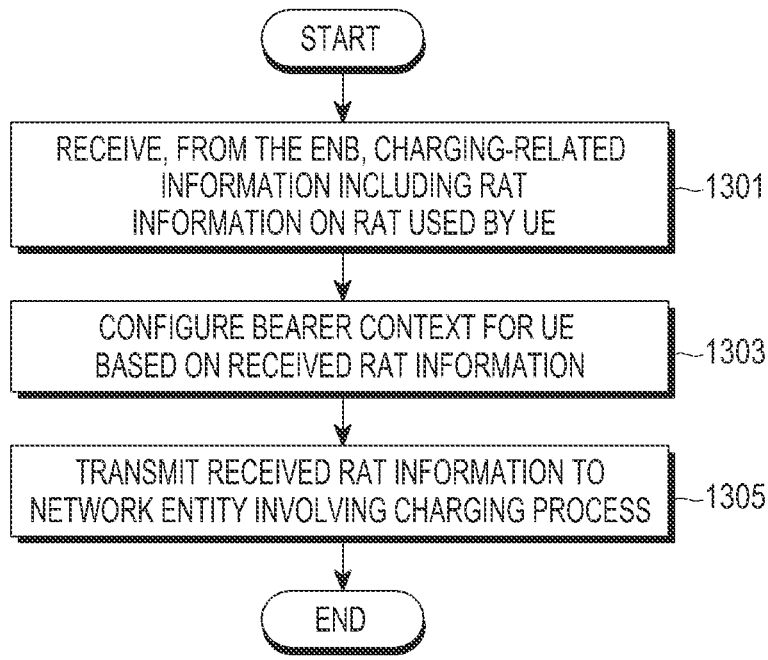
FIG. 13 is a view illustrating a method in which an MME processes charging in a wireless communication system supporting a plurality of RATs according to an embodiment of the present disclosure.

FIG. 13 is a view illustrating a method in which the MME 305 processes charging in a wireless communication system supporting a plurality of RATs according to an embodiment of the present disclosure.

Referring to FIG. 13, at operation 1301, the MME 305 receives charging-related information including RAT information indicating the RAT used by the UE 301 from the eNB 303, and at operation 1303, the MME 305 configures a bearer context for the UE 301 based on the RAT information. At operation 1305, the MME 305 transmits the RAT information to, e.g., the PGW 309 involving the charging process. A specific procedure in case the embodiment of FIG. 13 is performed in the Attach procedure is described with reference to FIG. 5.

Figure 5:
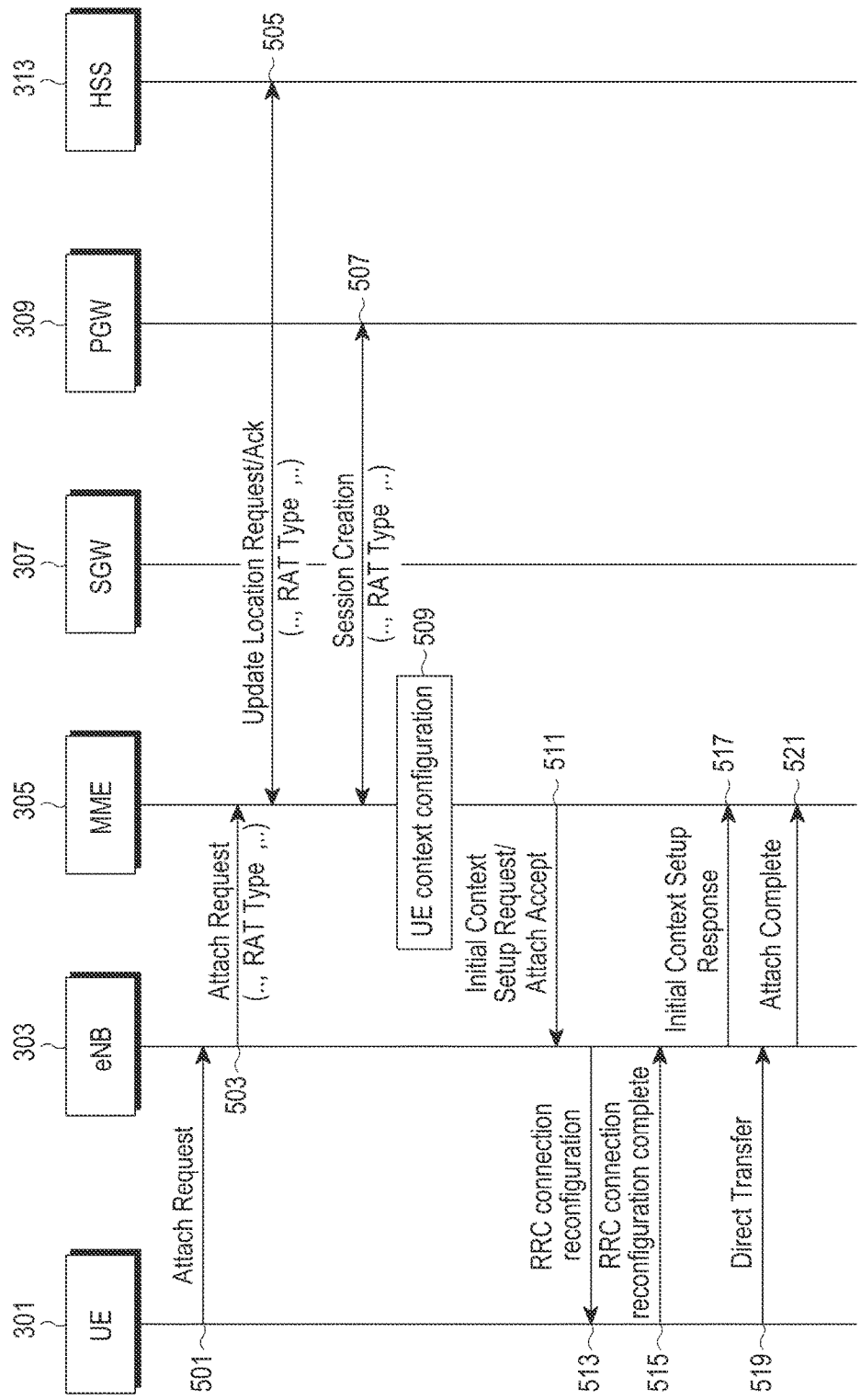
FIG. 5 is a view illustrating a method for transferring RAT information in an Attach process in an LTE-U system according to an embodiment of the present disclosure.

FIG. 5 is a view illustrating a method for transferring RAT information in an Attach process in an LTE-U system according to an embodiment of the present disclosure. As the operation of operations 501 to 521 in the Attach procedure of FIG. 5, the known Attach procedure specifying the network initial access operation of the UE 301 in the 3GPP standard may be used. Accordingly, no further detailed description of the known Attach procedure is given. The Attach procedure of FIG. 5 differs from the known Attach procedure in that at operation 503 of FIG. 5, the eNB 303 includes the information (RAT type) on the RAT accessed by the UE 301 when transmitting an Attach Request message to the MME 305. The same RAT information is also included in the Update Location Request information transmitted at operation 505 and the Session Creation message transmitted at operation 507. The MME 305 configures a UE context reflecting the RAT information of the UE 301 at operation 509. Accordingly, the network entities in the EPC may be aware that the RAT accessed by the UE 301 is the LTE-U-based RAT through the RAT information (RAT type). The RAT information may be configured in various formats of information that may indicate LTE-U.

Figure 6:
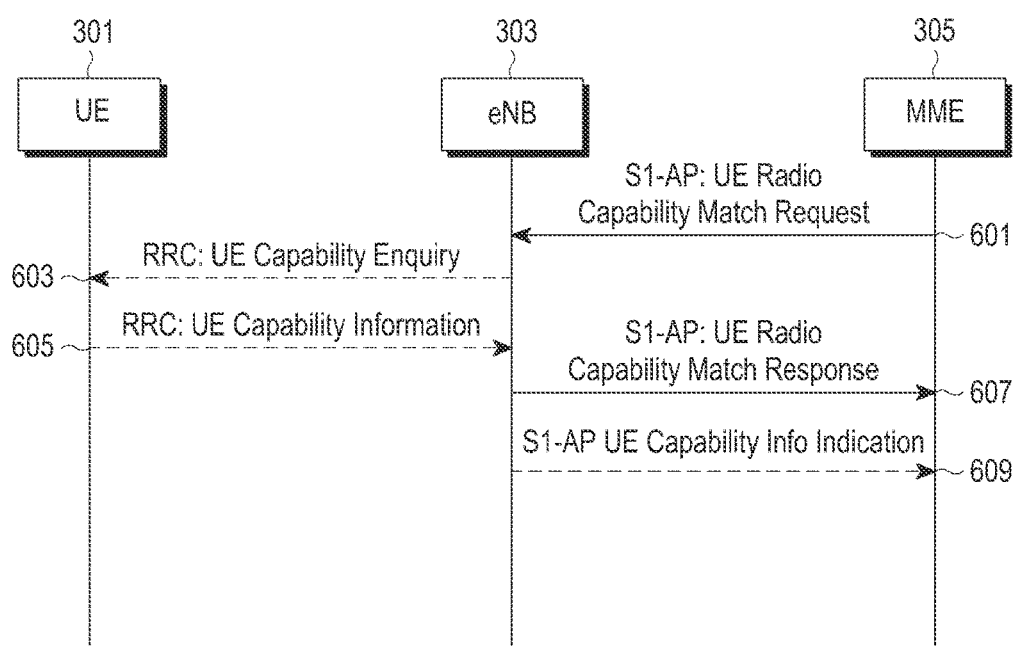
FIG. 6 is a view illustrating a method for obtaining RAT information through a radio capability match procedure according to an embodiment of the present disclosure.

Meanwhile, in case the MME 305 fails to obtain the RAT information (RAT type) through the Attach procedure/Tracking Area Update procedure/Service Request procedure or is unaware of the RAT information (RAT type) of the UE 301 for a particular reason, the MME 305 may be aware of the RAT information of the UE 301 through a radio capability match procedure. As the operation of operations 601 to 609 in the radio capability match procedure of FIG. 6, the known procedure set forth in the 3GPP standard may be used. Accordingly, no further detailed description of the radio capability match procedure is given. The radio capability match procedure of FIG. 6 is different from the known radio capability match procedure in that information (RAT type) on the RAT accessed by the UE 301 is included in an S1-AP message (i.e., a UE Radio Capability Match Response message) transmitted at operation 607 of FIG. 6. The MME 305, after obtaining the RAT information through the S1-AP message at operation 607, may transfer the same to the SGW 307/PGW 309 through, e.g., a legacy GTP-C message. The S1-AP message at operation 607 is a brand-new S1-AP message defined as in the following Table 3 in the instant embodiment.

TABLE 3

Bearer RAT information Notification (user identity, charging related information, . . . )
Bearer RAT information Notification ACK Meanwhile, in case the UE 301 primarily uses the LTE-based first RAT and additionally uses the LTE-U-based second RAT, the following approach may be put to use to deliver the RAT information. The eNB 303 may transmit the RAT information to the PGW 309 using the legacy message defined in the 3GPP standard or a brand-new message as proposed in this embodiment. For example, in case the UE 301 can use the LTE-U-based second RAT, it may generate a dedicated EPS bearer for LTE-U, or may additionally generate a PDN connection for LTE-U through a process of generating multiple PDN connections and use the same.

Specifically, the eNB 303 may inform that the RB used by the UE 301 is the LTE-U bearer by including the RAT information in the S1-AP message transferred to the MME 305 and transmitting the same. The MME 305 may configure the bearer context of the UE 301 in the MME 305 based on the RAT information and provide the RAT information to the SGW 307/PGW 309 as well.

Figure 7:
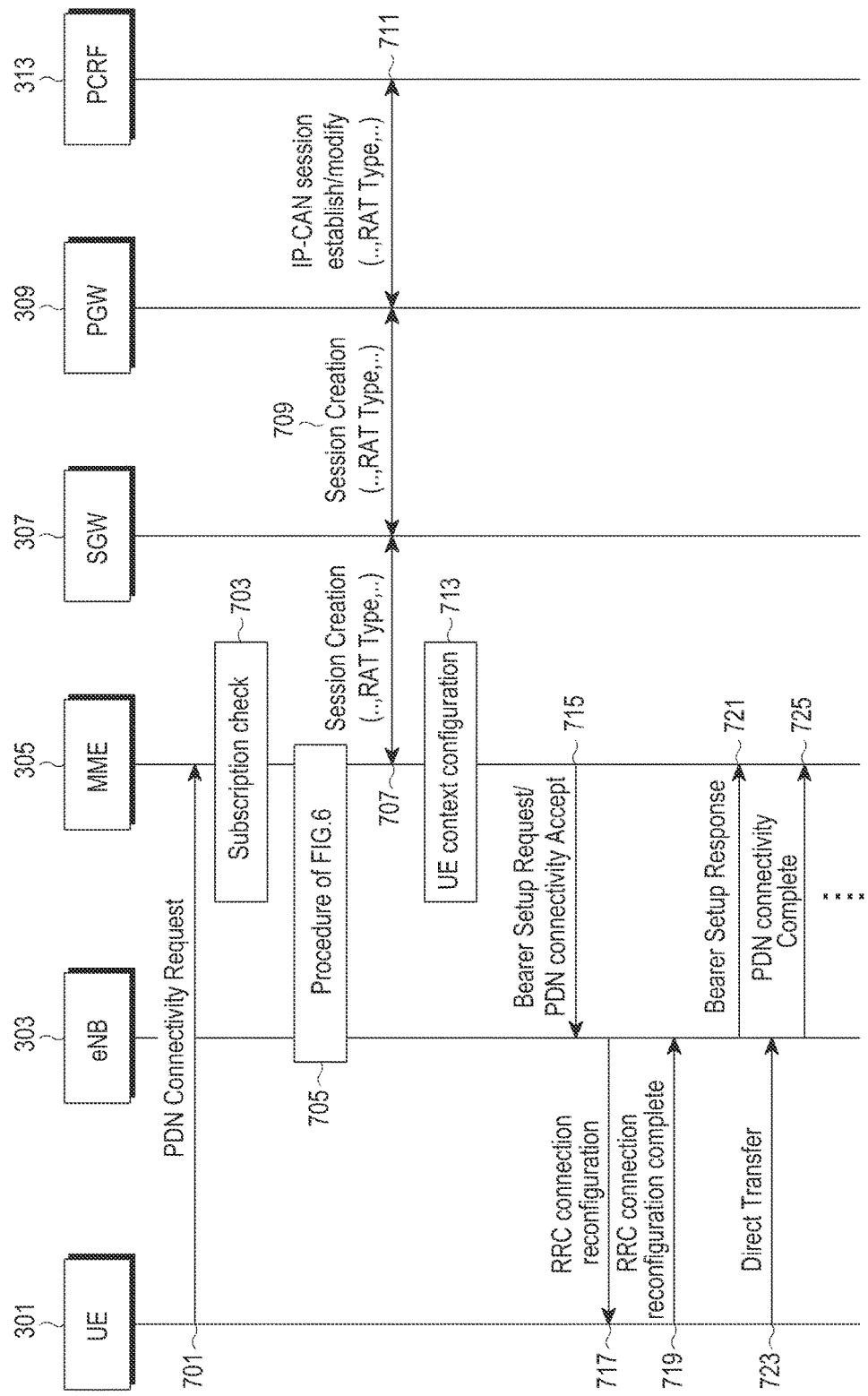
FIG. 7 is a view illustrating a method for additionally generating a PDN connection for LTE-U in a multi-PDN connection generation procedure and transferring RAT information according to an embodiment of the present disclosure.

FIG. 7 is a view illustrating a method for additionally generating a PDN connection for LTE-U in a multi-PDN connection generation procedure and transferring RAT information according to an embodiment of the present disclosure. As the operation of operations 701 to 725 in the multi-PDN connection generation procedure of FIG. 7, the known multi-PDN connection generation procedure in the 3GPP standard may be used. Accordingly, no further detailed description of the known multi-PDN connection generation procedure is given. The multi-PDN connection generation procedure of FIG. 7 differs from the known multi-PDN connection generation procedure in that the present procedure transfers the RAT information to a network entity of the EPC in the process of additionally generating a PDN connection for LTE-U. To that end, if the MME 305 receives a PDN connectivity request from the UE 301 at operation 701, the MME 305 identifies whether the UE 301 may use the LTE-U-based RAT by identifying the subscription information of the UE 301 at operation 703. If possible, the MME 305 identifies the RAT information through the method of FIG. 6 at operation 705. Thereafter, the MME 305 transfers the RAT information in the session creation process of operations 707 to 711. The MME 305 configures a UE context reflecting the RAT information of the UE 301 at operation 713.

Meanwhile, in case the MME 305 fails to obtain the RAT information (RAT type) from the eNB 303 or is unaware of the RAT information (RAT type) of the UE 301 for a particular reason, the MME 305 may be aware of the RAT information of the UE 301 through a radio capability match procedure as shown in FIG. 6. Further, the MME 305, after obtaining the RAT information through the S1-AP message described above in connection with FIG. 6, may transfer the same to the SGW 307/PGW 309 through, e.g., a legacy GTP-C message. The S1-AP message is the same as the message described above in connection with Table 3.

Table 4 below represents the MME context added with the RAT information per the scheme described above in connection with the embodiment of FIG. 3B, which adds the RAT information used by the EPS bearer to the legacy MME context.

TABLE 4

| For each active PDN connection: | |
|---|---|
| Subscribed APN-AMBR | The Maximum Aggregated uplink and downlink MBR values to be shared across all Non-GBR bearers, which are established for this APN, according to the subscription of the user |
| APN-AMBR | The Maximum Aggregated uplink and downlink MBR values to be shared across all Non-GBR bearers, which are established for this APN, as decided by the PDN GW |
| For each bearer within the PDN connection: | |
| RAT | RAT indicates the RAT that this EPS bearer utilizes (e.g. E-UTRAN, LTE-U) |

Now specifically described is a method for generating charging information according to an embodiment of the present disclosure.

Charging information generated in the WCDMA or LTE system includes, e.g., CDR. According to an embodiment of the present disclosure, the CDR generated by the eNB 303 or the PGW 309 contains RAT information to generate charging information per RAT. The following Table 5 represents the RAT information (RAT type) contained in the CDR, and Table 6 shows the value of the RAT type in case "LTE-U" is included as the RAT type.

TABLE 5

| Field | Category | Description |
|---|---|---|
| ... | ... | ... |
| RAT Type | OC | This field indicates the Radio Access Technology (RAT) type currently used by the Mobile Station. |

TABLE 6

| RAT Type | Values (Decimal) |
|---|---|
| <reserved> | 0 |
| UTRAN | 1 |
| GERAN | 2 |
| WLAN | 3 |
| GAN | 4 |
| HSPA Evolution | 5 |
| EUTRAN | 6 |
| Virtual | 7 |
| LTE-U | 8 |
| <spare> | 9-255 |

Figure 8:
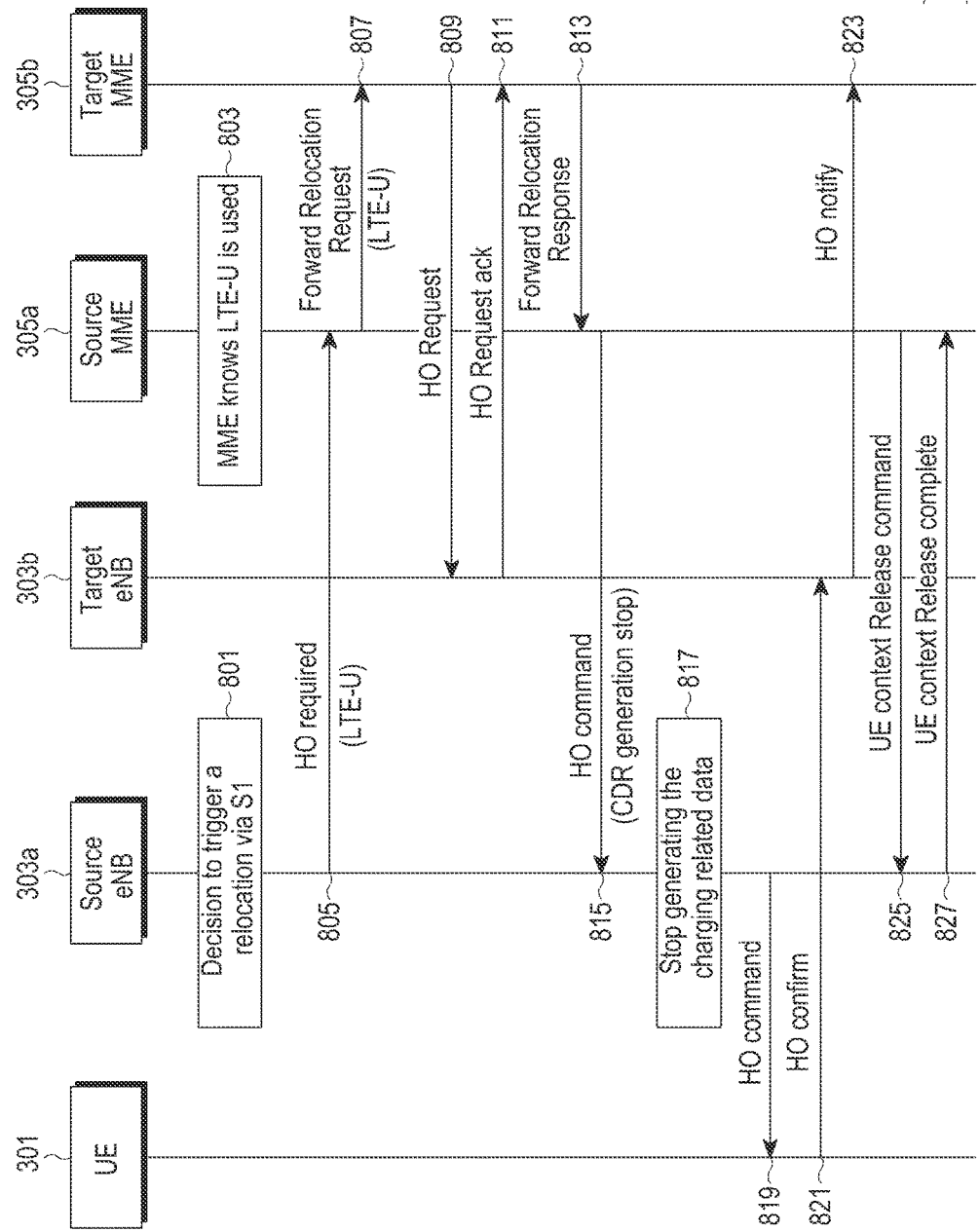
FIG. 8 is a view illustrating a method for stopping generation of charging information upon handover in an LTE-U system according to an embodiment of the present disclosure.

FIG. 8 is a view illustrating a method for stopping generation of billing information upon handover in an LTE-U system according to an embodiment of the present disclosure.

As the operation of operations 801 to 827 in the procedure for UE 310, source eNB 303a, destination eNB 303b, source MME 305a, and destination MME 305b, of stopping generation of charging information upon handover as shown in FIG. 7, the known upon-handover charging information generation stop procedure in the 3GPP standard may be used. According, no further detailed description of the known procedure is given. The procedure of FIG. 8 differs from the known procedure in that at operation 803 the source MME 305a is aware that the UE 301 uses the LTE-U bearer; at operations 805 and 807, information indicating the handover is handover related to LTE-U; at operation 815, charging information generation stop information is included in a handover command message transferred from the source MME 305a to the source eNB 303a; and at operation 817, the source MME 305a receiving the charging information generation stop information performs an operation for stopping generation of charging-related information.

Meanwhile, according to an embodiment of the present disclosure, the eNB generates charging information in the following two cases. First, when the eNB generates only charging information for a particular RAT. Second, when the eNB generates charging information for all the RATs. Further, the eNB may generate charging information by alternately performing the first and second cases. The above-described charging information generation method may be previously configured in the eNB by the provider, or may be selected under a particular condition. Here, an example of the particular condition may be time. The same method as the generation of charging information may apply likewise to the case where the eNB generates charging-related information.

Now, a scheme for providing a policy service is specifically described according to an embodiment of the present disclosure.

According to an embodiment of the present disclosure, QoS may be differently applied by configuring a provider's policy depending on RAT information. Proposed are an embodiment in which a particular EPS bearer is allocated depending on RAT information and an embodiment in which a transmission rate is determined depending on RAT information.

Figure 14:
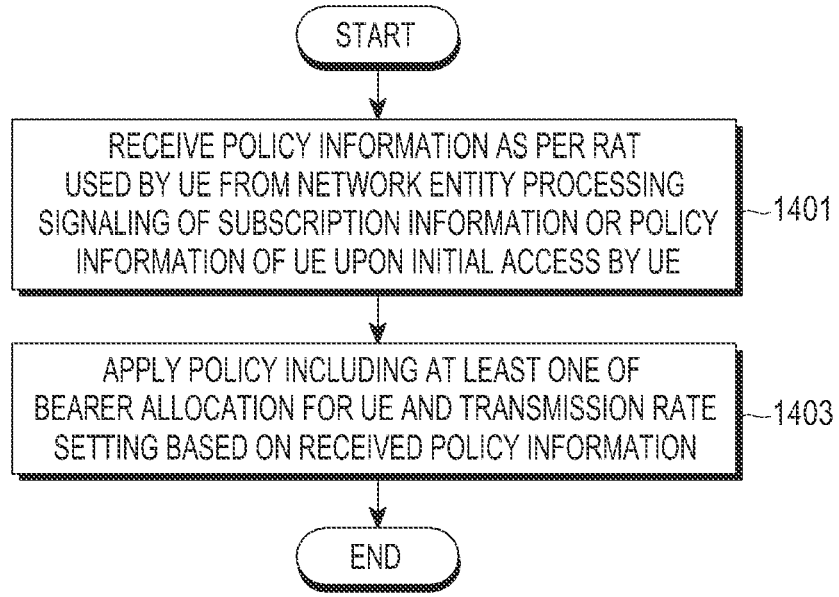
FIG. 14 is a view illustrating a method for processing a QoS policy to be applied to a UE in a wireless communication system supporting a plurality of RATs according to an embodiment of the present disclosure.

FIG. 14 is a view illustrating a method for processing a QoS policy to be applied to a UE in a wireless communication system supporting a plurality of RATs according to an embodiment of the present disclosure.

Referring to FIG. 14, the eNB 303, at operation 1401, receives QoS policy information per the RAT used by the UE 301 from the MME 305 processing signaling of policy information or subscription information of the UE 301. The eNB 303, at operation 1403, applies a QoS policy including at least one of a bearer allocation and a transmission setting for the UE 301 based on the received QoS policy information.

First, according to the embodiment of the present disclosure in which a particular bearer is allocated depending on RAT information, the following distinct schemes are described: scheme 3 that allows a particular RAT type to use Guaranteed Bit Rate (GBR) bearer only or non-GBR bearer only; and scheme 4 that allows a particular RAT type to use only the bearer of a particular QoS Class Identifier (QCI).

Scheme 3

In the embodiment of scheme 3, policy is represented as a provider's policy or mapping rule. In this embodiment, LTE-U may use only non-GBR bearer. The eNB 303 may implement the policy by mapping a data radio bearer (DRB) identifier (ID) of LTE-U to a non-GBR S1 bearer identifier (S1 TEID).

Scheme 4

In the embodiment of scheme 3, policy is represented as a provider's policy or mapping rule. In this embodiment, a particular RAT type may use only the bearer of a particular QCI. For example, LTE-U may use QCI 6 and CQI 7 only. In schemes 3 and 4, the eNB 303 may obtain the policy from the subscription information of the UE 301 stored in the HSS or from the PCRF.

Figure 9:
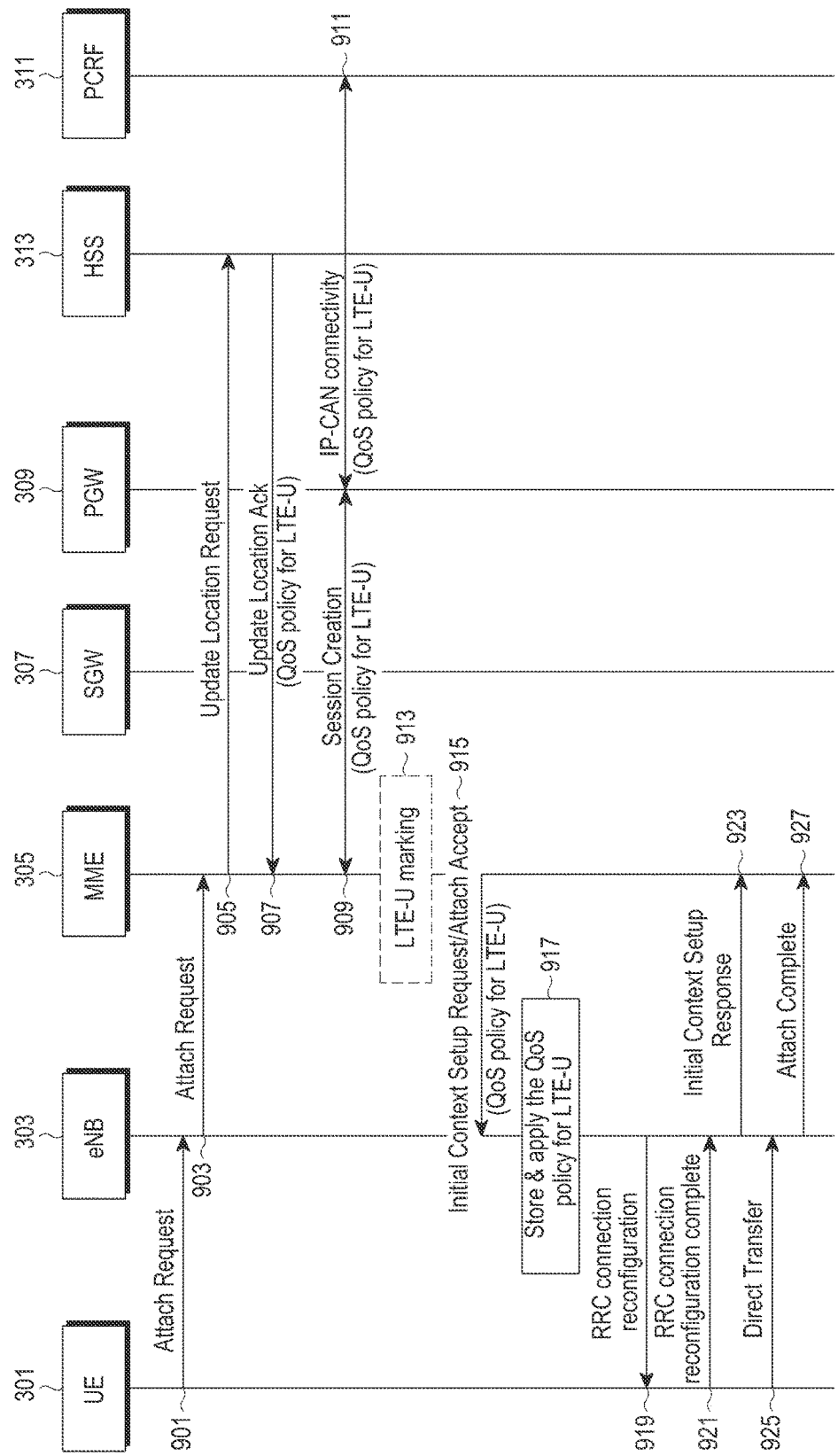
FIG. 9 is a view illustrating a method for transferring, to an eNB, a QoS policy allocating a particular evolved packet system (EPS) bearer depending on RAT information according to an embodiment of the present disclosure.

FIG. 9 is a view illustrating a method for transferring, to an eNB, a QoS policy allocating a particular EPS bearer depending on RAT information according to an embodiment of the present disclosure. FIG. 9 illustrates an example of transferring a QoS policy in the Attach procedure.

Referring to FIG. 9, the UE 301, at operation 901, transfers an Attach request to the eNB 303, and the eNB 303, at operation 903, transfers the Attach request to the MME 305. The MME 305, at operation 905, transmits an Update Location Request message to the HSS 313 to register the location information of the UE 301 and requests the subscription information of the UE 301. The HSS 313, at operation 907, transmits an Update Location Ack message (including QoS policy for LTE-U) to the MME 305. Here, the Update Location Ack message includes the QoS policy to be applied to LTE-U. The QoS policy includes the policy mentioned in scheme 3 or scheme 4. The MME 305, at operation 909, transmits a session creation Request message to the PGW 309, and the PGW 309, at operation 911, receives the QoS policy for LTE-U through an IP-CAN connectivity process with the PCRF 311 and transfers a Session Creation Response (including the QoS policy for LTE-U) through the SGW 307 to the MME 305.

Thereafter, the MME 305, at operation 913, may use the QoS policy received from the HSS 313 or may use the QoS policy received from the PCRF 311. Or, the MME 305 may combine the two policies and use the combined policies. In this embodiment, assume that the policy transferred from the PCRF 311 to the MME 305 is included in, e.g., a parameter recognizable by the MME 305. The MME 305 stores the QoS policy for LTE-U as necessary. The MME 305, at operation 915, transfers an Initial Context Setup Request/Attach Accept including the QoS policy for LTE-U to the eNB 303, and the eNB 303, at operation 917, stores the received QoS policy for LTE-U and prepares to apply the QoS policy. The subsequent operation of operations 919 to 927 is the same as the legacy Attach procedure.

The embodiment of the present disclosure, in which a transmission rate is determined depending on RAT information, is divided into scheme 5 in which a UE-Aggregate maximum Bit-Rate (AMBR)/APN-AMBR is set up depending on a particular RAT type and scheme 6 that excludes UE-AMBR/APN-AMBR from computation for a particular RAT type. In the embodiment of scheme 5, the UE-AMBR means the maximum transmission rate (maximum bit rate) that may be used by the UE 301 to the maximum for all non GRB bearers. According to the instant embodiment, upon use of LTE-A, UE-AMBR and APN-AMBR may be separately set up.

Figure 10:
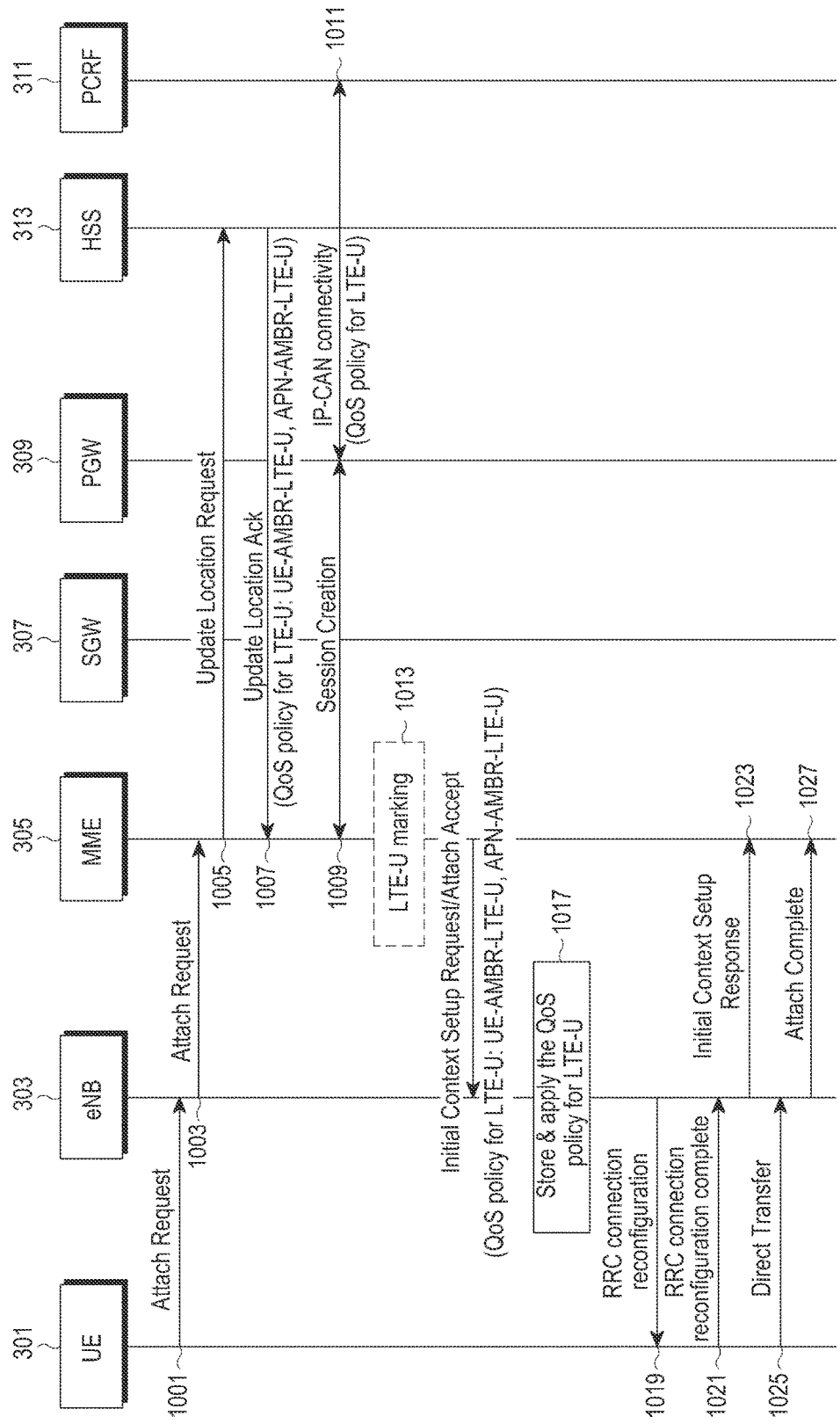
FIG. 10 is a view illustrating a method for transferring, to an eNB, a Quality of Service (QoS) policy determining a transmission rate depending on RAT information according to an embodiment of the present disclosure.

FIG. 10 is a view illustrating a method for transferring, to an eNB, a QoS policy determining a transmission rate depending on RAT information according to an embodiment of the present disclosure. FIG. 10 illustrates an example of transferring a QoS policy in the Attach procedure. The operation of operations 1001 to 1027 in FIG. 10 is basically the same as the operation of operations 901 to 927 in FIG. 9, and the content of the QoS policy for LTE-U is to transfer policy information determining a transmission rate depending on RAT information as in scheme 5 or 6.

Figure 15:
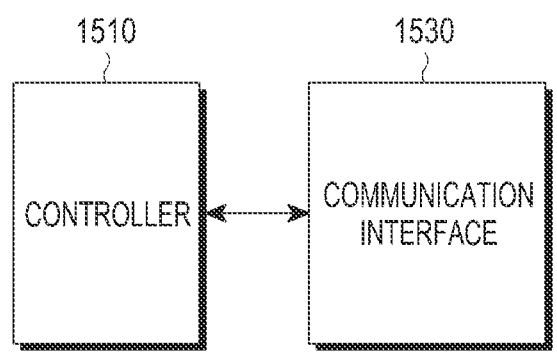
FIG. 15 is a block diagram illustrating the configuration of a network entity processing charging in a wireless communication system supporting a plurality of wireless access technologies according to an embodiment of the present disclosure.

FIG. 15 is a block diagram illustrating the configuration of a network entity processing charging in a wireless communication system supporting a plurality of radio access technologies according to an embodiment of the present disclosure. The network entity shown in FIG. 15 may be implemented to include a controller 1510 controlling the operation of generating charging information or charging-related information, transmitting and/or receiving the information by the methods described above in connection with the various embodiments of FIGS. 3A to 14 and a communication interface 1530 for communication with other network entity. The network entity of FIG. 15 may be various network entities involving a charging process, such as the eNB 303 or the MME 305.

Although the MME has been described, by way of example, as the network entity processing signaling subscription information or policy information of the UE to provide a charging process or policy service in the above-described various embodiments of the present disclosure, it should be noted that the network entity is not limited to the MME. In other words, according to an embodiment of the present disclosure, the HSS or PCRF may directly perform the function of the MME. Further, the function of the MME may be replaced by any network entity that performs a function related to the subscription information or policy information of the UE.

Accordingly, according to the above-described various embodiments of the present disclosure, upon use of an LTE-U-based RAT in a wireless communication system supporting a plurality of RATs, charging information may be efficiently processed, and the provider's policy service may be efficiently applied through the charging information process.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for processing charging in a wireless communication system supporting a plurality of radio access technologies (RATs), the method comprising:
identifying, by a base station, a RAT being used by a user equipment (UE), among the plurality of RATs including a first RAT and a second RAT, based on a radio frequency band being used by the UE; and
generating, by the base station, charging information per use of a communication service by the UE according to the identified RAT being used by the UE,
wherein a radio bearer for the UE of the first RAT and a radio bearer for the UE of the second RAT are individually configured by the base station.

2. The method of claim 1, wherein the charging information includes a charging data record (CDR) of the UE.

3. The method of claim 1, wherein the RAT used by the UE includes at least one of the first RAT using a frequency in a licensed band or the second RAT using a frequency in an unlicensed band.

4. The method of claim 3, further comprising transmitting the generated charging information to a provider's network server collecting the charging information.

5. The method of claim 1,
wherein the generating of the charging information further includes:
receiving charging-related information used for the generating of the charging information from at least one other base station; and
generating the charging information based on the charging-related information, and
wherein the charging-related information includes at least one of RAT information indicating a type of the RAT used by the UE, a duration of communication by the UE, or information on an amount of data transmitted by the UE.

6. A base station in a wireless communication system supporting a plurality of radio access technologies (RATs), the base station comprising:
a communication interface; and
a processor configured to:
identify a RAT being used by a user equipment (UE), among the plurality of RATs including a first RAT and a second RAT, based on a radio frequency band being used by the UE, and
generate charging information per use of a communication service by the UE according to the identified RAT being used by the UE,
wherein a radio bearer for the UE of the first RAT and a radio bearer for the UE of the second RAT are individually configured by the base station.

7. The base station of claim 6, wherein the charging information includes a charging data record (CDR) of the UE.

8. The base station of claim 6, wherein the RAT used by the UE includes at least one of the first RAT using a frequency in a licensed band or the second RAT using a frequency in an unlicensed band.

9. The base station of claim 8, wherein the processor is further configured to transmit the charging information to a provider's network server collecting the charging information.

10. The base station of claim 6,
wherein the processor is further configured to control the operation to:
receive charging-related information used for generating the charging information from at least one other base station, and
generate the charging information based on the charging-related information, and
wherein the charging-related information includes at least one of RAT information indicating a type of the RAT used by the UE, a duration of communication by the UE, or information on an amount of data transmitted by the UE.

11. A method for processing charging in a wireless communication system supporting a plurality of radio access technologies (RATs), the method comprising:
identifying, by a base station, a RAT being used by a user equipment (UE), among the plurality of RATs including a first RAT and a second RAT, based on a radio frequency band being used by the UE;
generating, by the base station, charging-related information including RAT information indicating the identified RAT being used by the UE for a charging process per use of a communication service by the UE; and
transmitting, by the base station, the charging-related information to a network entity involved with the charging process,
wherein a radio bearer for the UE of the first RAT and a radio bearer for the UE of the second RAT are individually configured by the base station.

12. The method of claim 11, wherein the charging-related information includes at least one of a duration of communication by the UE or information on an amount of data transmitted data.

13. The method of claim 11, further comprising:
transmitting the charging-related information to a first network entity processing signaling of subscription information or policy information of the UE,
wherein a second network entity generating charging information including a charging data record (CDR) receives the charging-related information via the first network entity.

14. The method of claim 13, wherein the charging-related information is transferred to the first network entity through a signaling message used in at least one of an initial access procedure, a tracking area update procedure, or a service request procedure in the wireless communication system.

15. The method of claim 11, wherein the RAT used by the UE includes at least one of the first RAT using a frequency in a licensed band or the second RAT using a frequency in an unlicensed band.

16. The method of claim 15, further comprising informing a first network entity that a radio bearer currently used by the UE is for the second RAT in a case where the UE uses the second RAT.

17. A base station in a wireless communication system supporting a plurality of radio access technologies (RATs), the base station comprising:
a communication interface; and
a processor configured to:
identify a RAT being used by a user equipment (UE), among the plurality of RATs including a first RAT and a second RAT, based on a radio frequency band being used by the UE,
generate charging-related information including RAT information indicating the identified RAT being used by the UE for a charging process per use of a communication service by the UE, and
transmit the charging-related information to a network entity involved with the charging process,
wherein a radio bearer for the UE of the first RAT and a radio bearer for the UE of the second RAT are individually configured by the base station.

18. The base station of claim 17, wherein the charging-related information includes at least one of a duration of communication by the UE or information on an amount of data transmitted data.

19. The base station of claim 17,
wherein the processor is further configured to transmit the charging-related information to a first network entity processing signaling of subscription information or policy information of the UE, and
wherein a second network entity generating charging information including a charging data record (CDR) receives the charging-related information via the first network entity.

20. The base station of claim 19, wherein the charging-related information is transferred to the first network entity through a signaling message used in at least one of an initial access procedure, a Tracking Area Update procedure, or service request procedure in the wireless communication system.

21. The base station of claim 17, wherein the RAT used by the UE includes at least one of the first RAT using a frequency in a licensed band or the second RAT using a frequency in an unlicensed band.

22. The base station of claim 21, wherein the processor is further configured to inform the first network entity that a radio bearer currently used by the UE is for the second RAT in a case where the UE uses the second RAT.

23. A method for processing charging in a wireless communication system supporting a plurality of radio access technologies (RATs), the method comprising:
receiving, by a first network entity processing signaling of subscription information or policy information of a user equipment (UE), charging-related information from a base station including RAT information that identifies a RAT being used by the UE, among the plurality of RATs including a first RAT and a second RAT, based on a radio frequency band being used by the UE;
configuring, by the first network entity, a bearer context for the UE based on the RAT information; and
transmitting, by the first network entity, the RAT information to a second network entity involved with a charging process,
wherein a radio bearer for the UE of the first RAT and a radio bearer for the UE of the second RAT are individually configured by the base station.

24. The method of claim 23, wherein the charging-related information is received from the base station through a signaling message used in at least one of an initial access procedure, a tracking area update procedure, or a service request procedure in the wireless communication system.

25. The method of claim 23, further comprising performing a radio capability match procedure with the base station to identify the RAT used by the UE, by the first network entity, in a case where the charging-related information is not received from the base station.

26. The method of claim 23, wherein the bearer context for the UE includes the RAT information.

27. A network entity for processing charging in a wireless communication system supporting a plurality of radio access technologies (RATs), the network entity comprising:
a communication interface; and
a processor configured to:
receive, from a base station, charging-related information including radio access technology (RAT) information indicating a RAT being used by a user equipment (UE),
configure a bearer context for the UE based on the RAT information, and
transmit the RAT information to another network entity involved with the charging process,
wherein the RAT being used by the UE is identified, among the plurality of RATs including a first RAT and a second RAT, based on a radio frequency band being used by the UE, and
wherein a radio bearer for the UE of the first RAT and a radio bearer for the UE of the second RAT are individually configured by the base station.

28. The network entity of claim 27, wherein the charging-related information is received from the base station through a signaling message used in at least one of an initial access procedure, a tracking area update procedure, or a service request procedure in the wireless communication system.

29. The network entity of claim 27, wherein the processor is further configured to perform a radio capability match procedure with the base station to identify the RAT used by the UE in a case where the charging-related information is not received from the base station.

30. The network entity of claim 27, wherein the bearer context for the UE includes the RAT information.

31. A method for processing a quality of service (QoS) policy to be applied to a user equipment (UE) in a wireless communication system supporting a plurality of radio access technologies (RATs), the method comprising:
receiving, by a base station, QoS policy information according to a RAT being used by the UE from a network entity processing signaling of subscription information or policy information of the UE; and
applying, by the base station, a QoS policy including at least one of bearer allocation for the UE or transmission rate setting based on the received QoS policy information,
wherein the RAT being used by the UE is identified, among the plurality of RATs including a first RAT and a second RAT, based on a frequency band being used by the UE,
wherein a radio bearer for the UE of the first RAT and a radio bearer for the UE of the second RAT are individually configured by the base station.

32. The method of claim 31, wherein in a case where the RAT used by the UE is a particular RAT using a frequency in an unlicensed band, a particular bearer corresponding to the particular RAT is allocated to the UE.

33. The method of claim 31, wherein in a case where the RAT used by the UE is a particular RAT using a frequency in an unlicensed band, a maximum transmission rate available to the UE is set corresponding to the particular RAT.

34. The method of claim 31, wherein the QoS policy information is received in an initial access procedure of the UE.

35. A base station in a wireless communication system supporting a plurality of radio access technologies (RATs), the base station comprising:
- a communication interface; and
- a processor configured to:
    - receive QoS policy information according to a radio access technology (RAT) being used by a user equipment (UE) from a network entity processing signaling of subscription information or policy information of the UE, and
    - apply a QoS policy including at least one of bearer allocation for the UE or transmission rate setting based on the received QoS policy information,
- wherein the RAT being used by the UE is identified, among the plurality of RATs including a first RAT and a second RAT, based on a frequency band being used by the UE,
- wherein a radio bearer for the UE of the first RAT and a radio bearer for the UE of the second RAT are individually configured by the base station.

36. The base station of claim 35, wherein in a case where the RAT used by the UE is a particular RAT using a frequency in an unlicensed band, a particular bearer corresponding to the particular RAT is allocated to the UE.

37. The base station of claim 35, wherein in a case where the RAT used by the UE is a particular RAT using a frequency in an unlicensed band, a maximum transmission rate available to the UE is set corresponding to the particular RAT.

38. The base station of claim 35, wherein the QoS policy information is received in an initial access procedure of the UE.

* * * * *